United States Patent [19]
Baxter et al.

[11] Patent Number: 5,513,226
[45] Date of Patent: Apr. 30, 1996

[54] DESTRUCTION OF PLUTONIUM

[75] Inventors: Alan M. Baxter, San Diego; Richard K. Lane, Encinitas, both of Calif.

[73] Assignee: General Atomics, San Diego, Calif.

[21] Appl. No.: 248,319

[22] Filed: May 23, 1994

[51] Int. Cl.⁶ .............................. G21C 1/30; G21C 1/12; G21G 1/08
[52] U.S. Cl. .......................... 376/170; 376/192; 376/194; 376/351; 376/395; 376/901
[58] Field of Search ..................................... 376/351, 343, 376/395, 427, 192–195, 317, 170–173, 901

[56] References Cited

U.S. PATENT DOCUMENTS

| | | | |
|---|---|---|---|
| 3,349,001 | 10/1967 | Stanton | 376/192 |
| 3,413,196 | 11/1968 | Fortescue et al. | 176/73 |
| 4,309,249 | 1/1982 | Steinberg et al. | 376/192 |
| 4,704,248 | 11/1987 | Lee et al. | 376/427 |
| 5,160,696 | 11/1992 | Bowman | 376/170 |

OTHER PUBLICATIONS

Bowman et al., "Nuclear Energy Generation and Waste Transmutation Using an Accelerator–Driven Intense Thermal Neutron Source", Los Alamos National Laboratory, LA–UR–91–2601, pp. 1–26.
Simon et al., "Design Features of the Gas Turbine Modular Helium Reactor (GT–MHR)", General Atomics Report GA–A21351, pp. 1–24, Jun. 1993.
Van Tuyle et al., "Accelrator–Driven Subcritical Target Concept for Transmutation of Nucelar Wastes", *Nuclear Technology*, vol. 101, pp. 1–17, Jan. 1993.
General Atomics article (GT–006), "The Gas Turbine–Modular Helium Reactor Offers Both Outstanding Safety and Economics", pp. 1–13, Feb. 9, 1994.

*Primary Examiner*—Behrend E. Harvey
*Attorney, Agent, or Firm*—Fitch, Even, Tabin & Flannery

[57] ABSTRACT

Plutonium is effectively and economically rendered unsuitable for employment in a device for creating a nuclear detonation. Weapons-grade plutonium is made into ceramic fuel in the form of spheroids of submillimeter size, coated with multi-layer fission-product-retentive coatings and disposed in sealed fuel chambers in graphite block fuel elements. These elements are used to form a core for a modular helium-cooled high temperature nuclear reactor which is operated to efficiently generate power by causing the hot high pressure helium coolant to drive a gas turbine directly connected to an electrical generator, which nuclear fuel core has about a 3-year lifetime. Spent nuclear fuel elements are removed at the end of 3 years and shifted to form the core for an accelerator-driven helium-cooled reactor wherein a subcritical core of spent fuel elements is safely caused to effectively continuously fission by a neutron flux created by a Linac which bombards a lead target with a beam of high energy protons. At the end of 1 to 2 more years, more than 99% of the original Pu-239 has fissioned or been transmuted, and the isotope distribution of remaining plutonium renders it no longer useful for carrying out a nuclear detonation. Such fuel elements can be securely stored without reprocessing in simple metal canisters in a long-term repository.

19 Claims, 5 Drawing Sheets

DESTRUCTION OF PLUTONIUM

This invention relates to the efficient destruction of plutonium isotopes obtained either from weapons-grade plutonium or spent nuclear reactor fuel or the like, and more particularly relates to the efficient, economical and near-term destruction of plutonium isotopes in a manner which effectively prevents clandestine diversion of plutonium and results in a final product that is unsuitable for use in weapons.

BACKGROUND OF THE INVENTION

As a result of the end of the Cold War, the nuclear powers face the problem of disposing of stockpiles of plutonium, particularly weapons grade plutonium (WG-Pu) including that recovered from the dismantling of nuclear weapons, as well as plutonium which is naturally bred as a by-product of fission power-generating reactors. It is now felt important to be able to dispose of such plutonium economically to make use of the nuclear potential of the plutonium isotopes in a manner which positively guards against diversion and which results in the creation of a final product that cannot feasibly be used in a weapons system.

Previous studies have generally assessed actinide burning to be an unattractive alternative; however, because of the difficulties that have continued to be encountered with licensing a suitable burial repository, the burning of actinides has now become more attractive. It has been proposed to transmutate nuclear waste using a subcritical mass configuration with a flux of neutrons supplied through a linear accelerator (see *Nuclear Technology*, 101, January 1993 "Accelerator-Driven Subcritical Target Concept for Transmutation of Nuclear Wastes", Van Tuyle et al., and LA-UR-91-2601 (1991) "Nuclear Energy Generation and Waste Transmutation Using an Accelerator-Driven Intense Thermal Neutron Source", Bowman et al., the disclosures of which are incorporated herein by reference). The Phoenix concept proposed in the 1993 article focuses on the disposal of wastes that have been generated in thermal power-generating reactors, particularly upon long-lived radioactive actinides obtained from light-water reactors (LWRs); the concept would employ a large linear proton accelerator (Linac) and would operate using a liquid sodium coolant system to generate power through a steam generator. However, this concept involves removal and reprocessing of the "nuclear fuel" at 2-year intervals, as well as removal of plutonium (a potential power source), and thus far, it has remained only in the conceptual stage both because of the expense and the length of time required.

More recently, scientists from the Los Alamos National Laboratory have proposed the use of nonaqueous systems for the accelerator-driven transmutation of waste, as well as for the accelerator-based conversion of fissionable nuclides in spent reactor fuel. The proposed systems are based upon the circulation of fluoride salt systems through a core region where an accelerator-driven neutron flux is created; heat exchange outside the region of the core would generate usable energy in order to produce electrical power to offset the cost of operation. However, the proposed system requires a 10-year cycle to produce 90% burnup of all plutonium isotopes, and because of the need for constant circulation of a flowing stream, the system would have potential for clandestine diversion of the flowable plutonium salts. Moreover, it would also be subject to the considerable safety considerations involved in circulating highly radioactive material including fission products having high levels of radioactivity.

As a result, the search has continued for more feasible and more attractive ways for economically disposing of plutonium in a manner which renders it incapable of thereafter being employed to create a nuclear detonation.

SUMMARY OF THE INVENTION

It has been found that a coupled installation which employs at least one inherently safe modular helium-cooled hex-block reactor (MHR) having a strong negative temperature coefficient of reactivity and at least one accelerator-driven subcritical, modular helium-cooled hex-block reactor (AD-MHR) could be used to economically and efficiently dispose of plutonium in a relatively short time period and in a manner that would render it incapable of use in nuclear weapons to create a nuclear detonation without isotope separation and enrichment. Preferably, 5 such modular helium-cooled hex-block reactor vessels are employed, all having a single standard size for economy of design and construction. Three of the reactor vessels are operated as power-generating reactors which preferably generate power using a gas turbine which is powered directly by the hot, circulating helium stream; these are referred to as GT-MHRs. They would preferably use plutonium fuel in a hex-block core which would preferably be designed to have a 3-year lifetime, with ⅓ of the core being refueled each year. The remaining 2 reactor vessels would be operated as accelerator-driven, subcritical reactors (AD-MHRs). Each of them would be fueled (in alternate years) by removing the spent ⅓ of the core from each of the 3 operating GT-MHRs each year and assembling the spent fuel elements to provide a new subcritical core loading for one AD-MHR. The loaded subcritical core could be operated for 1 to 2 years in the AD-MHR, at the end of which time over 80% and preferably at least about 90% of the total original plutonium would be destroyed, including over 99% of the plutonium 239; moreover, the remaining plutonium would be in a state of isotope distribution that would render it useless in a weapons system without being subjected to isotope separation and enrichment. Throughout the entire 5-year cycle, the Pu would be locked in sealed condition inside the graphite hex-blocks, and these fuel elements would be suitable for long-term burial in this form.

DETAILED DESCRIPTION OF THE PREFERRED EMBODIMENTS

At the present time, there is a substantial quantity of plutonium existing in the world, and additional plutonium is continuously being created in power-generating reactors operating on uranium-based fuels. Much of the plutonium is presently in the form of weapons-grade plutonium (WG-Pu) either in stockpiles for strategic materials or in actual weapons capable of effecting nuclear detonations. With the end of the Cold War, it is now considered to be important that international controls be placed on the possession of plutonium in order to avoid the proliferation of nuclear weapons that might lead to their potential use in local conflicts or which could fall into the hands of terrorists. At the same time, plutonium cannot be inexpensively destroyed, and the cost of providing adequate security for such stockpiles is extremely high. Moreover, so long as such weapons-grade material remains in existence, any security system, no matter how good, is always subject to breakdown and/or circumvention, so that only the destruction of WG-Pu can insure international safety in this respect.

It has been discovered that the use of plutonium as a nuclear fuel in the recently designed modular helium-cooled high temperature nuclear reactor (MHR) which employs hex-block fuel elements and which has an inherent strong negative temperature coefficient of reactivity, in combination with a similarly designed accelerator-driven subcritical helium-cooled reactor (ADMHR) that directly uses spent fuel elements from the core of the MHR provides a surprisingly simple and economically feasible near-term solution to this vexing problem. It has been found that plutonium in oxide form can be used as a primary fuel for the MHR and that it can be effectively employed to fuel a reactor core having a lifetime of about 3 years. Such a reactor can be operated very efficiently in a power-generating mode by coupling it together with a high temperature helium-driven gas turbine which is directly coupled to an electrical generator for the generation of a substantial amount of electrical power. High efficiency of overall operation is obtained by directly utilizing the high temperature helium-circulating stream to drive a gas turbine, as opposed to utilizing a secondary steam generation cycle, and this is possible even with plutonium fuel by using the MHR design.

By incorporating current refueling practices into this overall method for destroying Pu, it is convenient to refuel one-third of such a reactor core of an MHR each year, and the hex-block fuel arrangement wherein the blocks are distributed in columns throughout the reactor readily facilitates such a one-third core refueling scheme. By employing a group of three such MHRs at a single site or location, the spent fuel elements which are removed from one-third of the core of each MHR each year do not even leave the site, but they are together used to provide a complete subcritical core for an AD-MHR in a reactor vessel of essentially the same design as these power-generating MHRs, which is operated at the same site. As a result, these spent fuel elements are reassembled, without the need for any reprocessing, to create an entire, annular, subcritical reactor core for this fourth reactor vessel at the same site.

This AD-MHR is then operated at appropriate power levels using an accelerator arrangement where a supplementary flux of neutrons is created by a Linac which focuses a continuous beam of high-energy protons on strategically located target material disposed within an unfueled, graphite, central reflector region of the subcritical core. The target material is one, such as lead, which spalls fast neutrons in response to proton bombardment, and the fast neutron flux is caused to be moderated by the immediately surrounding graphite material so that the neutrons reaching the annular core region of spent fuel elements exhibit the typical reactor thermal neutron flux with a peak of about 0.1 ev, which is conducive to promoting fissioning of the fissile nuclides remaining in the spent nuclear fuel elements, particularly the isotopes of plutonium.

The heat generated by these fissions raises the temperature of the helium coolant stream that is being circulated in exactly the same manner as in the power-generating MHRs, with the hot, circulating helium stream being directed to a similar gas turbine for the generation of electrical power. Calculations show that such an accelerator-driven subcritical MHR designed for operation in tandem with three 600 MW(t) GT-MHRs will initially generate about 600 MW(t) and will continue to generate substantially more electrical power during its core lifetime than would be utilized to drive the linear accelerator and thus would contribute significantly to the overall economics of the entire installation.

It is shown that the operation of such a subcritical accelerator-driven MHR for about two years with a complete core made of the spent fuel elements from three operating power-generating MHRs would result in the destruction of over 80% of the plutonium nuclides originally present in the fuel either by fissioning or transmutation and under most conditions would result in destruction of over 90% of these nuclides. Moreover, it is shown that such a 5-year cycle of operation, namely 3 years in the core of a power-generating MCR followed by 2 years in the core of an AD-MCR, would destroy at least about 95% and likely about 99% or more of the Pu-239 isotopes which are of primary present concern. As a result of the feasibility of such a 2-year cycle, the employment of 2 AD-MHRs in combination with 3 power-generating MHRs provides a particularly attractive, self-sustaining installation.

An important feature of such an installation lies in the fact that the plutonium fuel is initially formed into minute spheroids less than 1 millimeter in diameter, and usually in the range of about 150 to 400 microns in diameter, which are then encapsulated in a multi-layer fission-product retentive coating wherein they remain sealed for their entire lifetime and, in accordance with the intention of the present operating method, presumably forever. These encapsulated Pu spheroids are formed into fuel compacts of rod shape using suitable carbonaceous binders, which fuel rods are then loaded into cylindrical chambers within the prismatic hex-blocks, for example into some 200 fuel chambers for a fuel element without a control rod passageway, and then sealed therein by appropriately installing permanent plugs at the ends of each of the fuel chambers. The fuel elements also contain chambers carrying burnable poison as described hereinafter. In this overall method, these fuel elements exist as integral entities for their entire 5-year lifetime in the reactor cores with no reprocessing occurring. As a result, these fuel elements, which would weigh on the order of several hundred pounds apiece, remain on-site and essentially tamper-proof as the encapsulated nuclear fuel is securely locked within the sealed fuel chambers. The hex-block fuel elements do not leave the site but are merely transferred from one of the 3 operating MHRs to constitute a new core for one of the 2 AD-MHRs.

It can be shown that the hex-block fuel elements which are removed after an approximately 2-year lifetime in the AD-MHR are in suitable condition for storage directly underground at a site designed for long-term radioactive decay in a simple metal container or the like. As a result of the 5-year cycle for the plutonium fuel, it is shown that the minimal plutonium nuclides remaining have such an isotope distribution that they are useless for employment in a device for creating a nuclear detonation. Thus, the plutonium has not only been effectively destroyed, but it has been destroyed in a manner wherein there is efficient generation of electric power (important from a strictly economic standpoint). Moreover, such destruction is carried out in a manner secure against clandestine diversion as a result of the plutonium being totally contained, locked and sealed within the confines of an impenetrable graphite block.

In addition to being able to handle and destroy these available stockpiles of weapons-grade plutonium, the method also provides further potential benefits in that highly radioactive actinides and fission-products having long half-lifes can optionally be burned in the reflector region surrounding the annular core of the ADM-HR. It has been found that the neutron flux in this region is adequate and of a character such as to effectively cause transmutation and/or some fissioning of these actinides; thus, the AD-MHR is of further advantage in that it can be used as a actinide burner to assist in dealing with the accompanying problem of ridding the world of highly radioactive actinide and fission-product waste, such as that naturally present in spent fuel elements from light water reactors (LWRs) which would also contain bred plutonium.

As previously indicated, the power-generating helium-cooled reactors which are employed are preferably the modular MHRs, and most preferably those which operate in conjunction with a gas turbine. The specifics of such a GT-MHR are disclosed in an article entitled "Design Features of the Gas Turbine Modular Helium Reactor" (GT-MHR)-GA-A 21351 by Simon et al., which was presented at the Fourth Annual Scientific and Technical Conference of the Nuclear Society "Nuclear Energy and Human Safety" (NE-93) Jun. 28, 1993, the disclosure of which is incorporated herein by reference.

Figure 1:
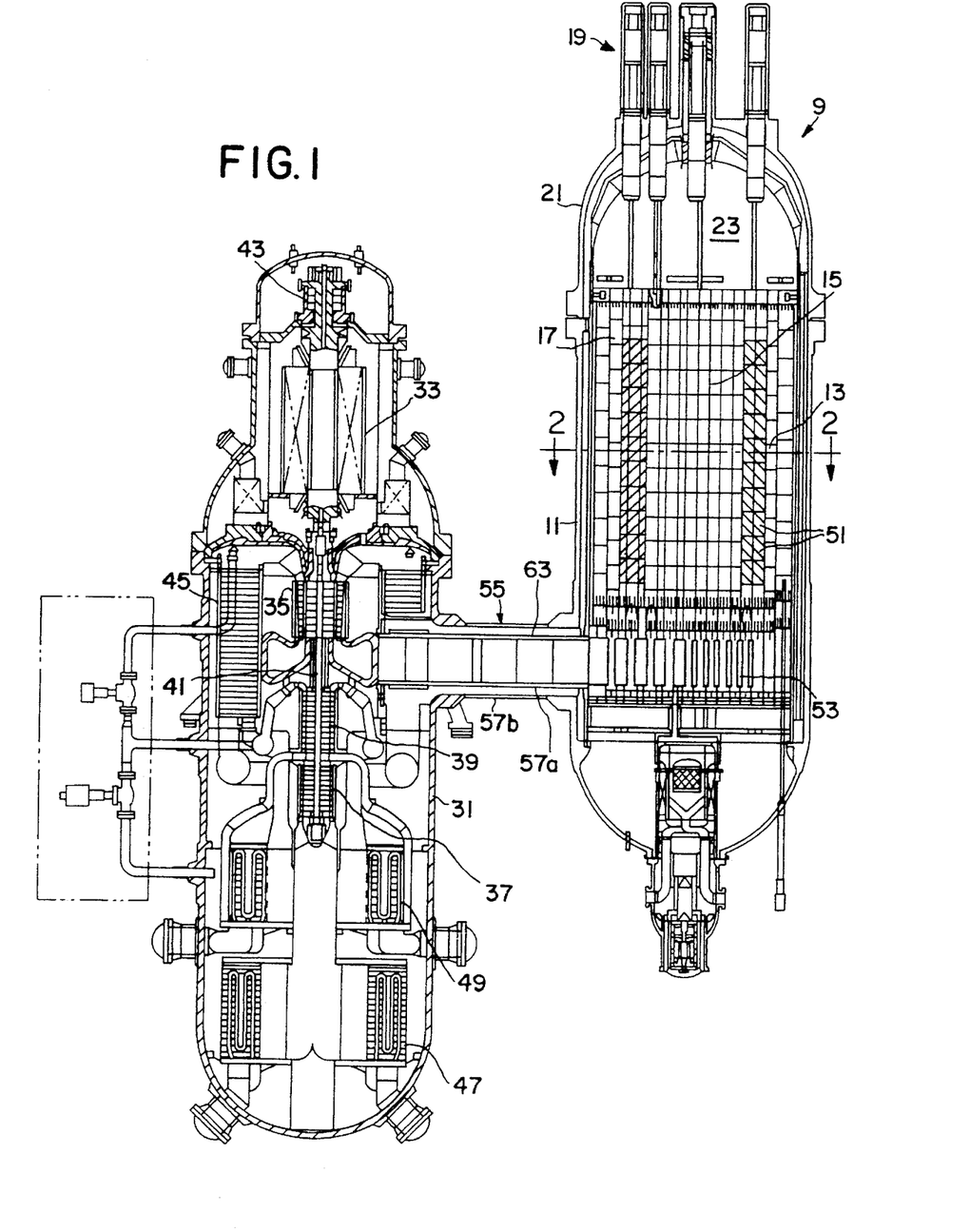
FIG. 1 is a schematic view showing a modular helium-cooled hex-block nuclear reactor coupled to a gas turbine-powered electrical power generator.
Figure 2:
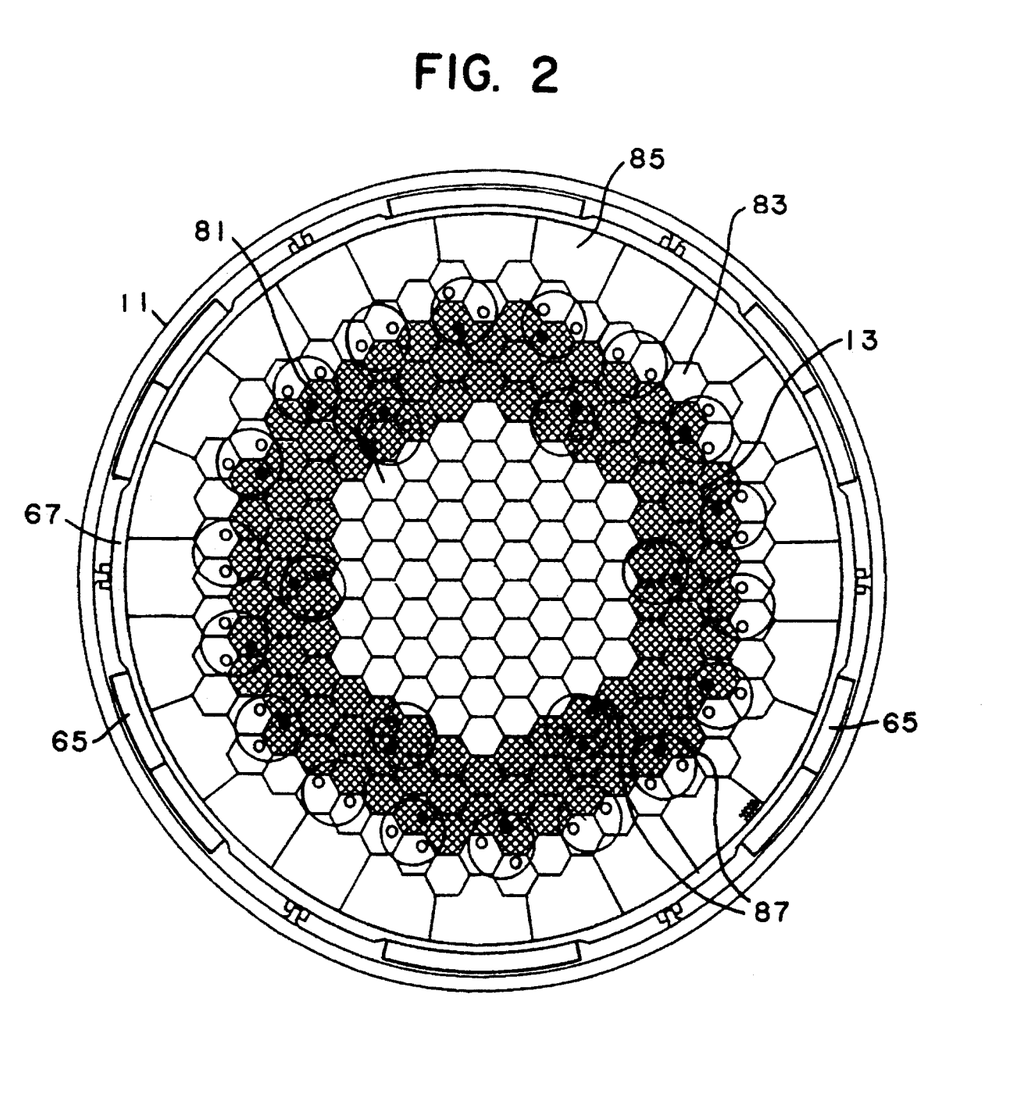
FIG. 2 is a schematic cross-sectional view of the core of the hex-block reactor shown in FIG. 1, taken generally along the line 2—2 of FIG. 1.

A gas turbine-modular helium-cooled reactor 9 (GT-MHR) is shown schematically in FIGS. 1 and 2, and it is felt that this reactor's ceramic-based fuel system is particularly well suited for use with a plutonium-based fuel and provides a unique capability for achieving a high level of passive safety, which is of course of extreme importance in a reactor fueled with plutonium. The coupling of this inherently safe reactor concept with the illustrated gas-turbine electrical generation arrangement provides a unique opportunity to effectively destroy plutonium while generating electrical power under economic conditions considered to be excellent. There is not felt to be any restraint on the amount of power that could be developed by scaling upward such a reactor system, which is generally dependent upon the size of the core and the associated equipment; however, a 600 MW(t), high-efficiency gas turbine installation is considered to be an appropriate design for purposes of illustration.

All of the vessels are preferably made from a suitable steel alloy, such as 9CR-1MO-V steel, and are uninsulated. The reactor vessel 11 on the right in FIG. 1 houses the reactor core 13 and the inner and outer surrounding reflector and graphite moderator material 15, 17, and it contains the usual fuel-element handling system 19 in the upper head 21 which extends down into what is called a core inlet plenum 23. The annular reactor core 13 is located centrally within the vessel, and helium coolant flows downward therethrough. The power conversion vessel 31 on the left contains the electrical generator 33 at its upper end which is mechanically connected to the gas turbine 35 and to two compressor sections 37, 39, all mounted on a single shaft 41 which is suspended by magnetic bearings all submerged within helium. The magnetic bearings 43 control rotational stability while eliminating the need for lubricants that would potentially contaminate the circulating helium stream. Also located within the power conversion vessel 31 is a recuperator 45, a precooler 47, and an innercooler 49 which are heat exchangers that may be of the standard design.

The helium flow through the core 13 begins with the supply of pressurized helium to the plenum 23 located above the core from which the helium coolant flows downward through cooling channels provided in individual fuel elements 51, which are described in detail hereinafter. The hot helium leaving the core enters a lower exit plenum 53 located below the core which directs the flow through a short cross-vessel 55 that extends between the side walls thereof and interconnects the reactor vessel 11 and the power conversion vessel 31. The cross-vessel 55 includes inner and outer, collinear, tubular sections 57$a,b$, and the hot helium flows through the inner tubular section 57$a$ from the lower plenum 53 in the reactor vessel and enters the gas turbine 41. In a reactor installation of this size, the pressurized helium might enter the turbine 41 at about 850° C. and 7.02 MPa (1017 psia).

The hot helium expands in passage through the turbine, and helium at a temperature of about 510° C. and 2.65 MPa (384 psia) flows through the hot side of six parallel recuperator modules 45 which are arranged in surrounding location to the centrally located turbine 41. These heat exchangers 45 transfer heat from the warm helium to the helium on the cold side of the recuperator which is on its return path to the reactor core. The warm helium next flows to the precooler 47 where heat is rejected to a liquid stream from a cooling tower, for example. The helium may enter the precooler 47 at a temperature of about 131° C. and a pressure of 2.62 MPa (380 psia), and it is cooled in the pre-cooler to about 33° C. From the pre-cooler, the cold helium is directed first to a low pressure compressor section 37, followed by a high pressure compressor section 39; the helium is raised in pressure from 2.60 MPa (377 psia) to 7.24 MPa (1049 psia).

Between the compressor sections, the helium is circulated through the innercooler 49 to remove some of the heat gained in the low pressure compressor section 37. The high pressure helium then enters the cold side of the recuperator modules 45 where the helium is raised in temperature from 112° C. at the compressor outlet to 490° C. at the recuperator outlet. Helium from the plurality of recuperators 45 is collected in a ring-shaped outlet plenum. The high pressure helium from the outlet plenum is directed through the outer annular portion 63 of the short cross-vessel 55, through which it flows back to the reactor vessel 11. Upon its return to the reactor vessel, the high pressure helium flows up through metallic riser channels 65 (best seen in FIG. 2) that are provided along the outside of the core barrel or inner liner 67 in order to reach the upper plenum 23 above the reactor core. The helium in the upper plenum is at a temperature of about 490° C. and 7.07 MPa (1025 psia) when it enters the cooling channels in the hexagonal fuel blocks 51. Additional details of the coupled reactor design are set forth in Bulletin GT-006 (Feb. 9, 1994) entitled "The Gas Turbine-Modular Helium Reactor Offers Both Outstanding Safety and Economics", the disclosure of which is incorporated herein by reference.

As previously indicated, the fissile nuclides and the radioactive fission products are retained within refractory-coated fuel particles. The integrity of these particle coatings is assured up to temperatures as high as 1600° C. as a result of their overall design. The fuel kernels themselves are spheroids of ceramic plutonium compounds, preferably plutonium oxides from which americium has been chemically separated; however, Pu oxycarbides or other such ceramic Pu fuels as known in the art might be used. The particles are less than a millimeter in size, and preferably the fuel kernels are about 150 to 400 microns in diameter. They may utilize a fission-product retentive jacket design, such as that shown in U.S. Pat. No. 3,649,452 to Chin et al., the disclosure of which is incorporated herein by reference. For example, the kernel can be surrounded by a porous carbon buffer layer, which is in turn encapsulated within an inner isotopic pyrolytic carbon layer, which is in turn surrounded by a silicon carbide barrier layer, which is itself surrounded by an outer isotopic pyrolytic carbon layer. Such coatings prevent any significant release of any radionuclides for long periods of time even at a temperature that would be reached only in case of a severe accident. The coated particles might be between about 600 and 900 microns in diameter, for example.

Figure 5:
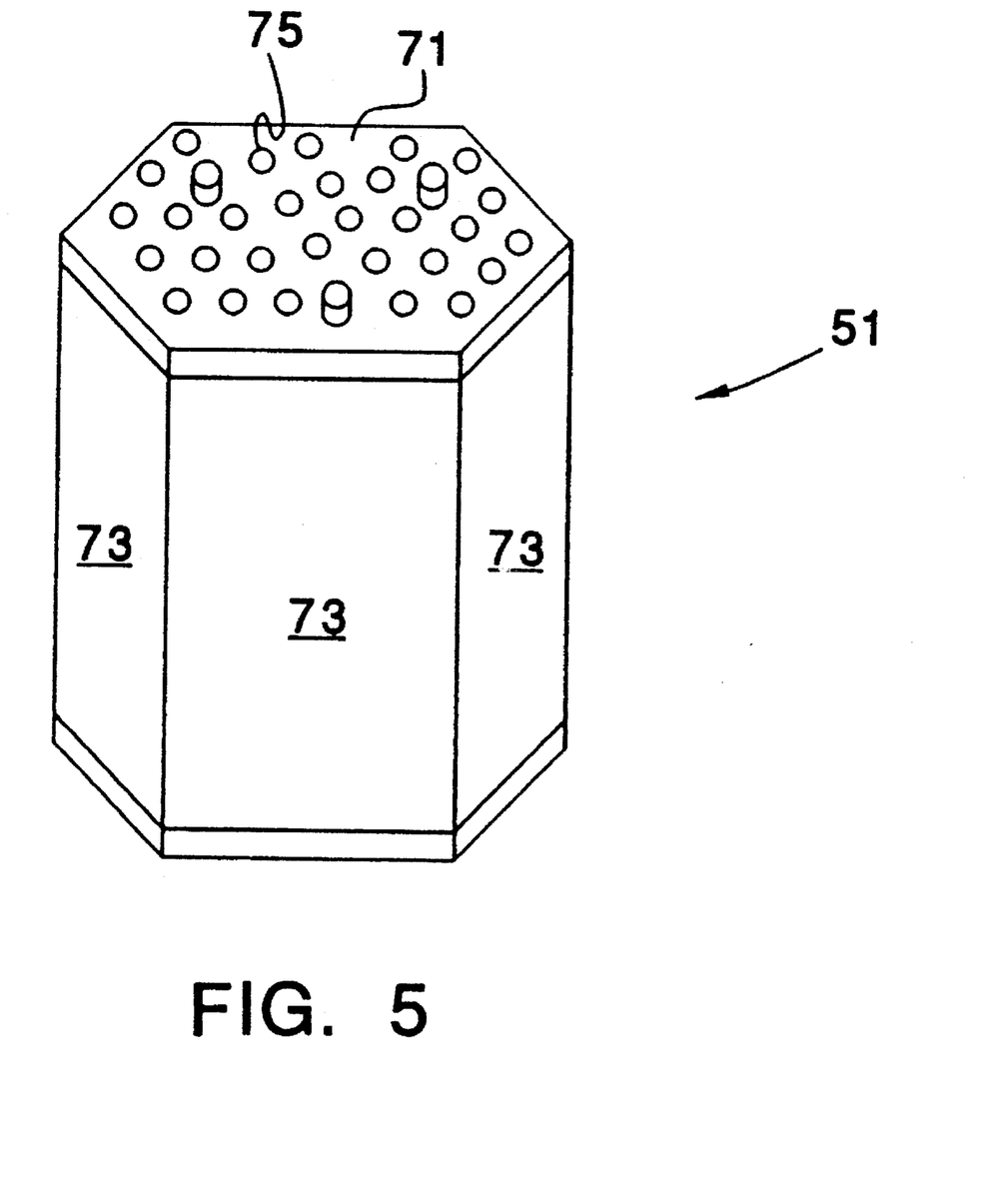
FIG. 5 is a perspective view showing one of the prismatic fuel elements used in the reactors of FIGS. 1–4.

The particles themselves are bonded into rod-shaped compacts using a graphitic binder and then inserted into cylindrical fuel chambers drilled as a part of a parallel array in a hexagonal graphite block which creates the body of the fuel element 51. Details of such fuel elements are disclosed in U.S. Pat. Nos. 3,413,196, 4,569,820 and 4,704,248, the disclosures of which are incorporated herein by reference. A perspective view of one of the fuel elements 51 is shown in FIG. 5. It is prismatic in shape and has flat top and bottom surfaces 71 which are parallel to each other and 6 side faces 73 which are rectangular in shape, so that the block has the cross-sectional shape of a regular hexagon. A plurality of aligned coolant passageways 75 extend completely through the fuel elements 61 from top to bottom, and when the fuel elements are aligned in vertical columns, the coolant passageways provide pathways for the helium completely through the reactor core.

In order to maintain a relative level of reactivity of the core, a burnable poison is provided in the fuel elements. The preferred burnable poison is erbium, e.g. erbium oxide, and an appropriate amount of erbium in the form of pins are included in the hex-block fuel elements 51, proportional to the amount of plutonium in the fuel kernels is provided in accordance with well known teachings in this art. This erbium contributes to the temperature coefficient of reactivity in the power-generating reactor 9 which is always negative. For example, 14 chambers in a fuel element 51 may be filled with erbium when there are 202 chambers filled with nuclear fuel.

The overall layout of the overall reactor core is best seen in FIG. 2 which is a cross-sectional view taken generally along the line 2—2 of FIG. 1. Generally, the overall core comprises a central or inner reflector section 81 of unfueled, removable, hexagonal, graphite blocks, and it is surrounded by the annular active core region 13 which consists of 1020 hex-block fuel elements 51 arranged in 3 annular rings., i.e. 102 columns each 10 fuel elements high. Another ring 83 of unfueled graphite blocks is located immediately exterior of the annular core 13 and provides the interior region of the outer reflector, which is formed primarily by more massive graphite block structures 85. Boronated pins are preferably located near the periphery of the outer reflector 85 to protect the steel vessel from neutron embrittlement. The core reactivity is controlled by the vertical movement of control rods (not shown) which travel in the circular cross-section channels 87 shown in the core and the outer reflector.

Overall, the helium coolant which has been heated in the reactor core is fed to the power conversion vessel 31 where it drives a gas turbine to produce electricity at high efficiency using the Brayton cycle. For a reactor core fueled with weapons-grade plutonium (WG-Pu), the reactor would preferably operate on a 3-year fuel cycle during which time at least about 90% of the original Pu-239 and at least about 65% of the total plutonium would be destroyed. In a preferred embodiment, one-third of the core is refueled each year, by replacing the group of fuel elements that had spent 3 years in the core and thus were considered to be spent fuel elements, using fresh fuel elements. Fuel elements 51 are removed through the fuel-handling apertures provided at the upper end of the upper plenum in the reactor vessel and replaced with fresh fuel elements of the same construction. The spent fuel elements are then combined with spent fuel elements from 2 other MHRs that are provided as a part of the same site installation, and together these three groups of elements constitute a subcritical core for an AD-MHR.

Figure 3:
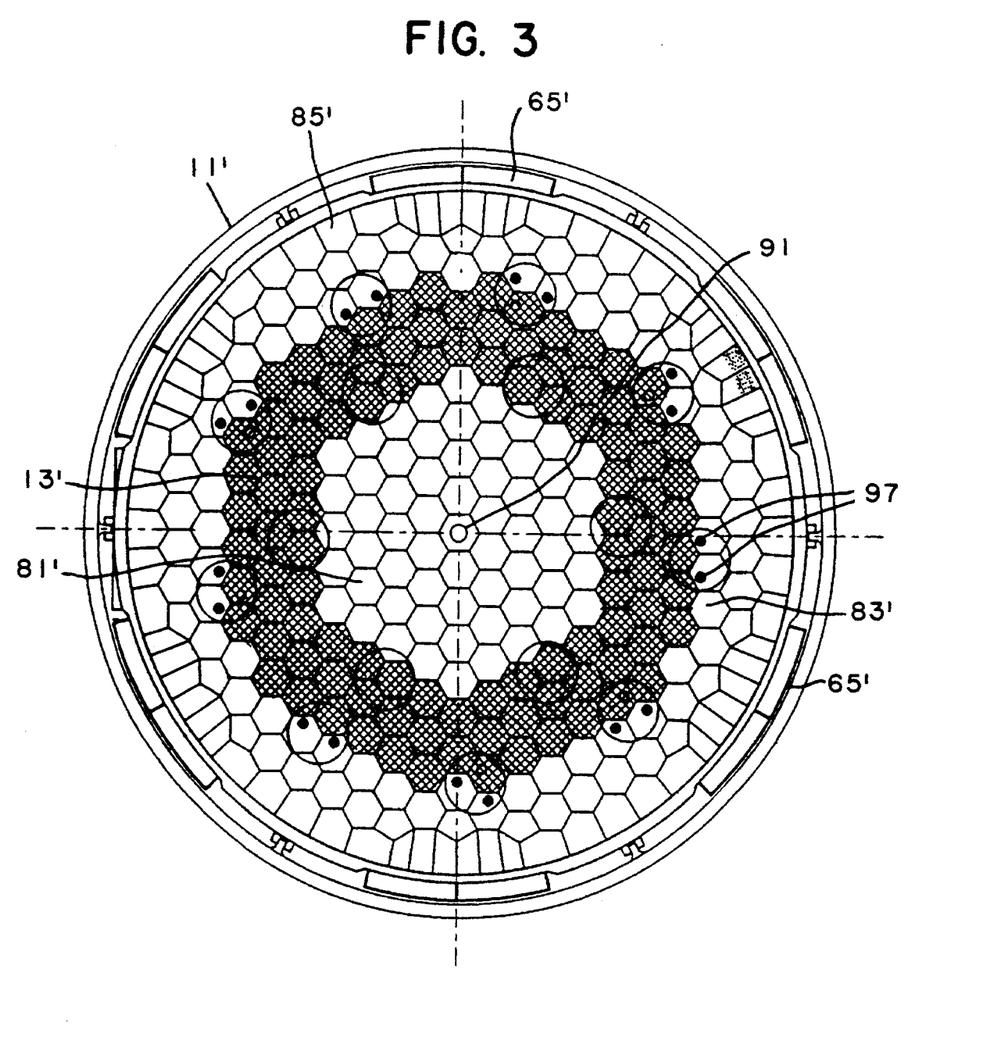
FIG. 3 is a view similar to FIG. 2 taken through the subcritical core of an AD-MHR of the same size and shape as the reactor shown in FIG. 1.
Figure 4:
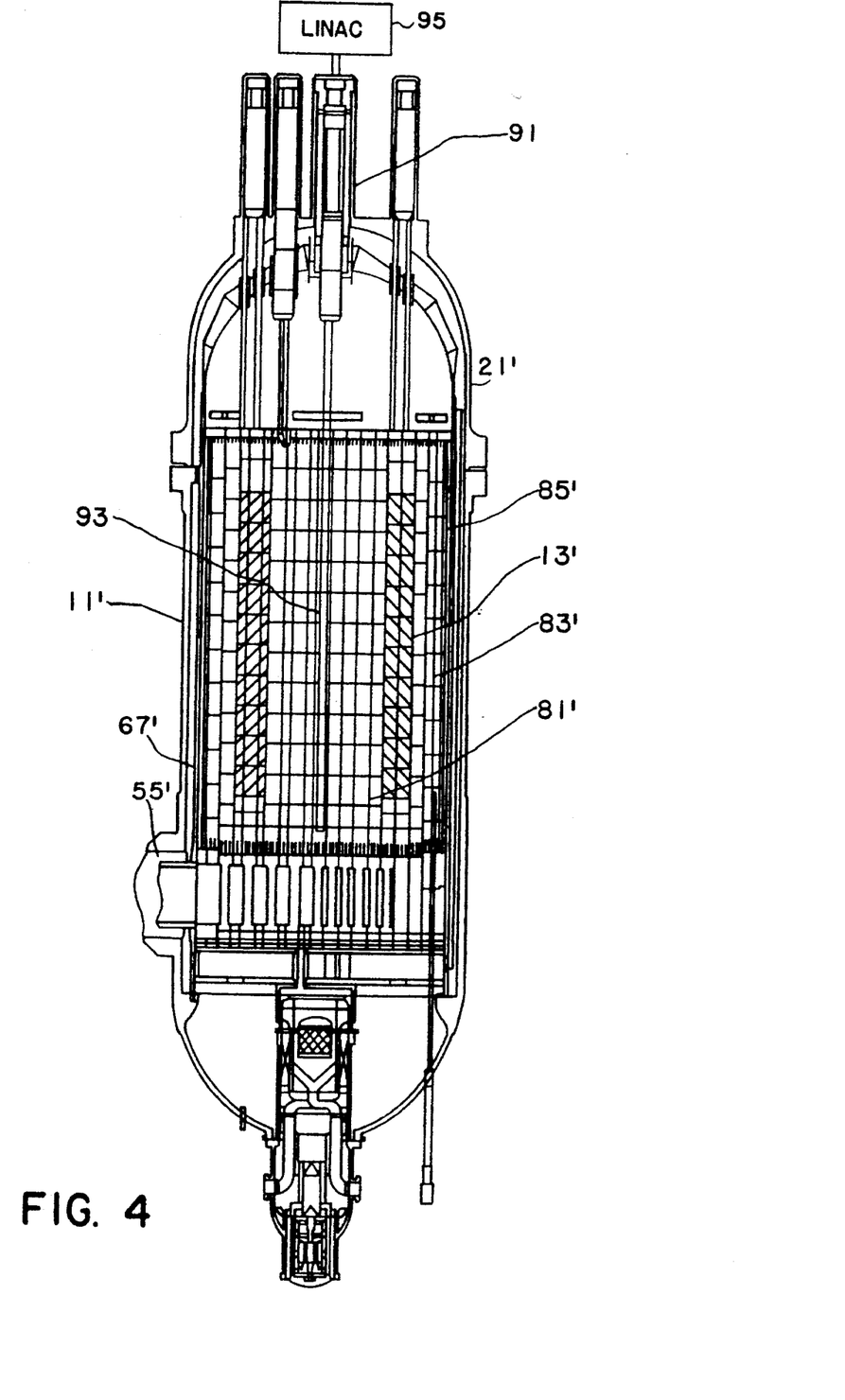
FIG. 4 is a partial schematic view of the accelerator-driven modular helium-cooled reactor of FIG. 3, similar to the view of FIG. 1.

The AD-MHR is depicted in FIGS. 3 and 4 and is similar in layout to the GT-MHR core with one exception, and for purposes of simplification, common structures are referenced with the same numbers plus a prime. A pressure-tight beam tube 91 passes through the central column of graphite reflector blocks, which beam tube leads to and houses an elongated metal target 93 which is of a character that produces high energy neutrons when struck by a proton beam from a high energy linear accelerator (Linac) 95 located thereabove. The protons travel in the vacuum pathway provided within the beam tube, and the target beam strength of the Linac is varied so as to vary the neutron flux with the irradiation time to which the fuel elements have been subjected. It is preferred and feasible for the AD-MHR to operate on a generally 2-year fuel cycle, so that 2 AD-MHRs will accommodate the spent fuel elements from the cores of 3 HT-MHRs. Accordingly, at the start of the 2 years, the target beam strength is at its lowest value for the reactivity of the core will be at its highest value, and the beam strength is increased to its highest value just prior to fuel element discharge near the end of the life cycle.

As earlier disclosed, the reactivity throughout the 3 years of the life of the hex-block fuel elements in the GT-MHRs is controlled by the inclusion of burnable poison, such as erbium oxide ($Er_2O_3$) pins, that can be located in separate chambers in the hex-block fuel elements 51. Burnable erbium oxide poisons are provided in the outer reflector blocks 83' and in the ring of blocks of the inner reflector 81' adjacent the annular core, to assure that the assembled core of spent fuel elements is subcritical. Additional unfilled chambers can be provided in the inner reflector blocks and in the outer reflector blocks to receive additional erbium pins for a subsequent core loading in the AD-MHR. The amount of erbium is calculated so that the reactor core arrangement is always subcritical, e.g. having a criticality value "K" not greater than about 0.95.

The design of the MHR is inherently safe because it has a strong negative temperature coefficient of reactivity, i.e. the nuclear characteristics of the materials combine to produce a power coefficient dominated by the temperature coefficient of reactivity which is strongly negative for all operating conditions. This large negative temperature coefficient will terminate the nuclear reaction if the core heats beyond normal operating temperatures. Part of this inherent safety is contributed by the employment of an annular core wherein the central section is unfueled graphite and thus positively militates against a supercritical mass forming centrally of the reactor even under accident conditions. Furthermore, the annular geometry of the core, the large height-to-diameter ratio, and the passive reactor cavity cooling system all contribute to ensure adequate decay heat removal from the core through passive thermal radiation conduction and natural convection through the uninsulated steel reactor vessel 11. Normal heat removal during shutdown is handled through the shutdown cooling system located below the reactor core in the lower vessel head.

For a reactor of the 600 MW(t) size, the outer diameter of the reactor vessel might be about 28 feet, and the core would consist of 102 separate active columns of 10 fuel elements each in vertical alignment. As indicated, the physical dimensions and character of the core region of the AD-MHR may preferably be exactly the same as the GT-MHR so that spent fuel elements 51 removed from one-third of the core of each of the 3 HT-MHRs would provide the complete loading for 1 AD-MHR and can be shifted without any modification to such fuel elements. However, duplication in this respect is not a prerequisite so long as the accelerator-driven reactor vessel is constructed to accept fuel elements of this same size which can be transferred without modification; for example, a smaller reactor could be constructed to accommodate two-thirds the number of fuel elements from a GT-MHR as part of a one-on-one arrangement where every two years the fuel elements unloaded from the GT-MHR would be stored for one year before being loaded into the core of this smaller AD-MHR. In the illustrated embodiment of FIG. 3, the accelerator beam tube 91 is shown as extending upward through a central penetration in the reactor vessel upper head 21' to the Linac 95. Although the Linac is merely shown schematically, it should be understood that the Linac will likely be of substantial length so that the accelerator beam tube 91 will likely extend horizontally for a substantial distance to reach the region above the reactor vessel upper head, where it would turn 90° downward at a location just above the core and bend to coincide with the axis of the vessel 11'. The direction of the beam of protons would be bent 90° by magnetic apparatus (not shown) well known in this art that can change the direction of the protons traveling in the vacuum within the beam tube 91.

The proton beam from the accelerator 95 is focused down the tube 91 located along the axial center of the central reflector region 81' within the annular fuel core 13, where the protons bombard a suitable target metal 93, such as tungsten or lead, which produces an intense flux of spallation neutrons. Preferably at least about $6 \times 10^{18}$ neutrons per second having an energy level of about 1 Mev are provided which are moderated in the central graphite reflector 81' to provide a typical reactor thermal neutron flux having a peak at 0.1 ev. It has been shown that the graphite hex-blocks can be irradiated for up to 20 years before irradiation-induced dimensional changes would require their removal from such a fuel core annulus, and thus the prospective 5-year cycle is well within acceptable limits.

The helium flow pattern through the core of the AD-MHR is exactly the same as the flow described hereinbefore for the MHR, and similar temperatures and pressures would be achieved in the helium stream flowing through the innerconnection vessel to the turbine at least during the beginning of the 2-year lifetime. Accordingly, by regulating the power to the Linac to provide the desired supplementary neutron flux throughout the approximately 2-year lifetime, the generation of an average of 300–400 MW(t) of electric power, with an initial maximum of 600 MW(t), can feasibly be generated by the AD-MHR. A further significant advantage of the AD-MHR is obtained by providing passageways 97, such as those that might be used for control rods in a power-generation GT-MHR, i.e. in the blocks 83' of the outer reflector adjacent the core, and using these passageways to irradiate and burn actinides and fission products from light-water reactor fuel or the like. If desired, entire light-water reactor fuel elements from initial core discharges or portions of equilibrium discharge cycle fuel elements could be disposed in such passageways for irradiation and destruction. Such is feasible because no control rods are needed because the reactivity of this subcritical core is regulated by the power applied to the Linac. Depending upon the fissile material in such LWR spent fuel material, further amounts of erbium may be used to assure K is always less than 1 for the AD-MHR core region.

In summary, this overall system provides an inherently safe method of electrical energy production at a very high efficiency, utilizing a proliferation-proof fuel cycle while totally destroying or minimizing fission products and actinide waste. From the time following initial processing, the plutonium fuel in the fission-product-retentive outer coatings is locked in sealed hex-block graphite elements, in which form it is maintained throughout the entire 5 years of power generation. At the end of this time, the isotope distribution of the plutonium is such that it is rendered totally useless for inclusion in any device designed to achieve a nuclear detonation without isotope separation, which is considered to be totally infeasible. Moreover, the waste disposal problem is also alleviated because the fuel elements themselves can be stored intact in an underground storage, protected simply in metal containers because the dense graphite blocks provide excellent environmental protection while the radionuclides are allowed to naturally decay in a suitable repository. Because throughout the entire lifetime the plutonium fuel is always locked within massive graphite hex blocks, several hundred pounds in weight with a very low concentration of Pu per individual block, the possibility of surreptitious diversion of nuclear materials is obviated. A totally economic and utterly feasible system is provided.

While the invention has been described with regard to certain preferred embodiments which constitute the best mode presently understood by the inventors for carrying out the invention, various changes and modifications as would be obvious to those skilled in this art may be made without deviating from the scope of the invention which is defined in the claims appended hereto. For example, although it is convenient to speak of a 3-year core lifetime for the GT-MHRs and a 2-year core lifetime for the AD-MHRs, other comparable complementary lifetimes could be utilized to still take advantage of 2 subcritical reactors servicing 3 power-generating reactors of about the same size, which could utilize spent fuel blocks removed from the power reactors without any reprocessing or treatment of any kind. Other ceramic forms of Pu fuel might be used than the oxide, e.g. the oxycarbide.

Particular features of the invention are emphasized in the claims which follow.

What is claimed is:

1. A method for using plutonium in a manner so as to render it no longer suitable for employment in a device to create a nuclear detonation, which method comprises forming spheroids of a size less than about 1 mm with plutonium in ceramic form, coating said plutonium-containing spheroids with multiple-layer fission-product retentive coatings that will retain therewithin substantially all fission products created as a result of the fissioning of the fissile plutonium nuclides in said plutonium, disposing said coated spheroids in a sufficient number of graphite block fuel elements of similar shape and employing said fuel elements to provide a nuclear reactor core for a helium-cooled high temperature power-generation reactor, operating said reactor to heat a circulating stream of helium by the fissioning of said fissile plutonium nuclides by neutrons primarily in the thermal range in said core and using said heated stream of helium to generate electric power until at least some of said graphite fuel elements are considered to be spent as a result of the decrease in the amount of fissile nuclides therein, halting operation of said reactor to remove said spent graphite block fuel elements from said core and to refuel said core with fresh fuel elements, locating said removed spent graphite block-fuel elements in an annular region to form a subcritical core region within a helium-cooled reactor vessel, which core is designed for operation with a supplementary neutron flux, operating a linear proton accelerator to supply a stream of protons to a central location in said subcritical core region so as to create a fast neutron flux comprising at least about $6 \times 10^{18}$ neutrons/sec having an energy level above about 1 Mev, causing said fast neutrons to be moderated to have a typical reactor thermal neutron flux peak of about 0.1 ev to promote fissioning of fissile nuclides in said spent graphite block fuel elements, withdrawing heat from the fissioning of nuclides in said subcritical core by circulating helium therethrough and using said heated helium to generate electrical power until at least about 80% of the original Pu-239 and Pu-240 nuclides have fissioned or been transmuted to higher isotopes, withdrawing said graphite block fuel elements from said subcritical reactor core, and storing said withdrawn graphite block fuel elements in long-term storage without the need for further processing because said plutonium nuclides are now of such an overall isotopic composition that said remaining plutonium is no longer suitable for employment in a device for creating a nuclear detonation.

2. A method according to claim 1 wherein said graphite block fuel elements have the general shape of regular prisms having 6 sides that are rectangles of the same size, which prisms have coolant passageways extending therethrough through which said helium stream is circulated to remove heat from fissioning.

3. A method according to claim 1 wherein said fuel elements have said coolant passageways in internal regions spaced from said side faces and are stacked in aligned columns in reactor and in said reactor vessel with said side faces in juxtaposition with side faces of adjacent columns and with said internal coolant passageways aligned with coolant passageways of other fuel elements in each said column.

4. A method according to claim 3 wherein said columns are arranged in said reactor and said reactor vessel in an annular array of at least about 3 concentric rings of fuel elements, in association with a central unfueled graphite reflector region and with a surrounding annular outer graphite reflector region.

5. A method according to claim 4 wherein burnable poisons are included in said graphite block fuel elements to maintain a relatively constant level of neutron flux within said power-generation nuclear reactor over the life of said fuel elements, and wherein said burnable poisons are likewise active within the initial subcritical core.

6. A method according to claim 4 wherein an elongated target is located centrally within said central reflector region, and said linear proton accelerator is operated to supply a beam of protons which bombard said target, said target being formed of a metal which readily spalls neutrons upon proton bombardment.

7. A method according to claim 6 wherein said target is lead.

8. A method according to claim 4 wherein said subcritical reactor core and the reactor vessel in which said subcritical core is located have the same spatial dimensions as said first-mentioned reactor core and said helium-cooled power-generation reactor, so that said subcritical core is composed of about the same number of graphite block fuel elements as said core in said helium-cooled power-generation nuclear reactor.

9. A method according to claim 1 wherein said coated spheroids are sealed within fuel chambers within said fuel elements.

10. A method according to claim 9 wherein said coated spheroids are bonded together as fuel sticks with said sealed chambers and burnable poisons are located in additional sealed chambers in each of said fuel elements.

11. A method for using plutonium in a manner so as to render it no longer suitable for employment in a device to create a nuclear detonation, which method comprises forming spheroids of a size less than about 1 mm with plutonium in oxide form, coating said plutonium-containing spheroids with multiple-layer fission-product retentive coatings that will retain therewithin at temperatures as high as 1600° C. substantially all fission products created as a result of the fissioning of as many as about 98% of the fissile plutonium nuclides in said plutonium, disposing said coated spheroids in a sufficient number of graphite block fuel elements of similar shape and employing said fuel elements to provide annular nuclear reactor cores for three helium-cooled high temperature power-generation reactors having negative temperature coefficients of activity, operating each said reactor to heat a circulating stream of helium by the fissioning of said fissile plutonium nuclides by neutrons primarily in the thermal range in said core and circulating said heated stream of helium through gas turbine means to generate electric power until such time as at least about one-third of said graphite fuel elements are considered to be spent as a result of the decrease in the amount of fissile nuclides therein, halting operation of each said reactor to remove said spent graphite block fuel elements from said core and to refuel said core with fresh fuel elements, locating said removed spent graphite block-fuel elements in an annular region of a helium-cooled reactor vessel of substantially the same size as in said three power-generating reactors to create a subcritical core, which core is designed for operation with a supplementary neutron flux, operating a linear proton accelerator to supply a stream of protons to a central graphite reflector region within said subcritical core so as to create a fast neutron flux comprising at least about $6 \times 10^{18}$ neutrons/sec having an energy level above about 1 Mev and causing said fast neutrons to be moderated in said central graphite region to have a typical reactor thermal neutron flux peak of about 0.1 ev to promote fissioning of fissile nuclides in said spent graphite block fuel elements, withdrawing heat from the fissioning of nuclides in said subcritical core by circulating helium therethrough and using said heated helium to generate at least a sufficient amount of electrical power to drive said linear proton accelerator, withdrawing said graphite block fuel elements from said subcritical reactor core after at least 1 year and not more than about 2 years by which time at least about 80% of the original Pu-239 and Pu-240 nuclides in said plutonium have fissioned or been transmuted to higher isotopes, and storing said withdrawn graphite block fuel elements in long-term storage without the need for further processing because said Pu nuclides are now of such an overall composition that said remaining Pu fuel is no longer suitable for employment in a device for creating a nuclear detonation.

12. A method according to claim 11 wherein said graphite block fuel elements have the general shape of regular prisms having 6 sides that are rectangles of the same size, which prisms have coolant passageways extending therethrough through which said helium stream is circulated to remove heat from fissioning.

13. A method according to claim 11 wherein said fuel elements have said coolant passageways in internal regions spaced from said side faces and are stacked in aligned columns in reactor and in said reactor vessel with said side faces in juxtaposition with side faces of adjacent columns and with said internal coolant passageways aligned with coolant passageways of other fuel elements in each said column.

14. A method according to claim 13 wherein said columns are arranged in each said reactor and in said reactor vessel in an annular array of at least about 3 concentric rings of fuel elements within a surrounding annular outer reflecting region.

15. A method according to claim 14 wherein burnable poisons are included in said graphite block fuel elements to maintain a relatively constant level of neutron flux within said power-generation nuclear reactor over the life of said fuel elements in said power-generation reactor and to provide some burnable poison in said subcritical core.

16. A method according to claim 14 wherein an elongated target is located centrally within said central reflector region, and said linear proton accelerator is operated to supply a beam of protons which bombard said target, said target being formed of a metal which readily spalls neutrons upon proton bombardment.

17. A method according to claim 16 wherein said target is lead.

18. A method according to claim 14 wherein coated spheroids are bonded together as fuel sticks and sealed within fuel chambers within said fuel elements.

19. A method according to claim 11 wherein each said power-generation reactor has a temperature coefficient that is always negative.

* * * * *